(12) United States Patent
Cheng et al.

(10) Patent No.: US 11,313,685 B2
(45) Date of Patent: Apr. 26, 2022

(54) METHOD AND APPARATUS FOR GENERATING DRIVING PATH

(71) Applicant: Beijing Baidu Netcom Science And Technology Co., LTD., Beijing (CN)

(72) Inventors: Xinjing Cheng, Beijing (CN); Ruigang Yang, Beijing (CN); Feixiang Lu, Beijing (CN); Hao Xu, Beijing (CN); Yajue Yang, Beijing (CN)

(73) Assignee: Beijing Baidu Netcom Science And Technology Co., Ltd., Beijing (CN)

( * ) Notice: Subject to any disclaimer, the term of this patent is extended or adjusted under 35 U.S.C. 154(b) by 0 days.

(21) Appl. No.: 16/677,327

(22) Filed: Nov. 7, 2019

(65) Prior Publication Data

US 2020/0240792 A1 Jul. 30, 2020

(30) Foreign Application Priority Data

Jan. 25, 2019 (CN) .......................... 201910075062.1

(51) Int. Cl.
*G06T 7/70* (2017.01)
*G06T 7/55* (2017.01)
(Continued)

(52) U.S. Cl.
CPC ............ *G01C 21/32* (2013.01); *B64C 39/024* (2013.01); *E02F 9/261* (2013.01); *G05D 1/0219* (2013.01); *G06T 7/55* (2017.01); *G06T 7/70* (2017.01); *G06T 17/05* (2013.01); *H04N 5/247* (2013.01); *B64C 2201/123* (2013.01); *B64C 2201/127* (2013.01); *G05D 1/0088* (2013.01); *G05D 2201/0202* (2013.01); *G06T 2207/10032* (2013.01); *G06T 2207/30241* (2013.01); *G06T 2207/30261* (2013.01)

(58) Field of Classification Search
None
See application file for complete search history.

(56) References Cited

U.S. PATENT DOCUMENTS

2013/0151062 A1\* 6/2013 Lee .................. B62D 1/28
701/26
2018/0218214 A1\* 8/2018 Pestun ................. G06K 9/0063
(Continued)

FOREIGN PATENT DOCUMENTS

CN 104036279 A 9/2014
CN 105318888 A 2/2016
(Continued)

*Primary Examiner* — Samuel D Fereja
(74) *Attorney, Agent, or Firm* — Nixon Peabody LLP

(57) ABSTRACT

Embodiments of the present disclosure relate to a method and apparatus for generating a driving path. The method includes acquiring a two-dimensional image of a driving site obtained by a camera provided on an unmanned aerial vehicle through aerial photography, and a two-dimensional image of a site in front of a vehicle photographed by a camera provided on the vehicle; generating a global map based on the two-dimensional image of the driving site, and generating a local map based on the two-dimensional image of the site in front of the vehicle; and performing path planning based on the global map and the local map, to generate a global path and a local path, the local path following a direction of the global path.

13 Claims, 4 Drawing Sheets

(51) Int. Cl.
*G06T 17/05* (2011.01)
*G01C 21/32* (2006.01)
*G05D 1/02* (2020.01)
*E02F 9/26* (2006.01)
*B64C 39/02* (2006.01)
*H04N 5/247* (2006.01)
*G05D 1/00* (2006.01)

(56) References Cited

U.S. PATENT DOCUMENTS

| | | | |
|---|---|---|---|
| 2018/0372841 | A1 | 12/2018 | Hieida et al. |
| 2019/0241070 | A1* | 8/2019 | Ota ..................... G02B 27/01 |
| 2020/0084353 | A1* | 3/2020 | Wacey ................ H04N 13/271 |
| 2020/0117201 | A1* | 4/2020 | Oetken ................ G06K 9/0063 |
| 2020/0208994 | A1* | 7/2020 | Askeland ............... G01C 21/30 |
| 2020/0401148 | A1* | 12/2020 | Hong .................. G05D 1/0246 |

FOREIGN PATENT DOCUMENTS

| | | |
|---|---|---|
| CN | 105388913 A | 3/2016 |
| CN | 106910217 A | 6/2017 |
| CN | 207301793 U | 5/2018 |
| JP | 2017013653 A | 1/2017 |
| JP | 2018121311 A | 8/2018 |
| JP | 2018151845 A | 9/2018 |
| KR | 101096592 B1 | 12/2011 |
| KR | 20150135007 A | 12/2015 |
| KR | 20160085963 A | 7/2016 |
| KR | 20180065760 A | 6/2018 |
| WO | 2017149813 A1 | 9/2017 |

\* cited by examiner

METHOD AND APPARATUS FOR GENERATING DRIVING PATH

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of autonomous driving technology, and specifically to a method and apparatus for generating a driving path.

BACKGROUND

An autonomous vehicle is a novel smart vehicle, precisely controls, calculates, and analyzes all parts of the vehicle mainly through a control apparatus (i.e., a vehicle-mounted smart controller), and finally issues an instruction via an ECU (electronic control unit) to control different devices of the autonomous vehicle respectively, thereby achieving fully automatic running of the vehicle, and achieving the purpose of autonomous driving of the vehicle.

To achieve the purpose of autonomous driving of the vehicle, it is necessary to pre-plan a driving path, so as to control autonomous driving of the autonomous vehicle along the driving path. At present, the conventional driving path generating approach is to provide a laser sensor and a camera on the autonomous vehicle, achieves a wide range of coarse-grained sensing using the laser sensor, achieves a small range of fine-grained sensing using the camera, and generate the driving path based on both the coarse-grained information sensed by the laser sensor and the fine-grained information sensed by the camera.

SUMMARY

Embodiments of the present disclosure propose a method and apparatus for generating a driving path.

In a first aspect, an embodiment of the present disclosure provides a method for generating a driving path, including: acquiring a two-dimensional image of a driving site obtained by a camera provided on an unmanned aerial vehicle through aerial photography, and a two-dimensional image of a site in front of a vehicle photographed by a camera provided on the vehicle; generating a global map based on the two-dimensional image of the driving site, and generating a local map based on the two-dimensional image of the site in front of the vehicle; and performing path planning based on the global map and the local map, to generate a global path and a local path, the local path following a direction of the global path.

In some embodiments, the camera provided on the unmanned aerial vehicle is a monocular camera, and the two-dimensional image of the driving site is a monocular image; and the generating a global map based on the two-dimensional image of the driving site includes: performing three-dimensional reconstruction on the monocular image, to obtain a three-dimensional model of the driving site; determining positions of the vehicle and a destination in the three-dimensional model of the driving site; and annotating the three-dimensional model of the driving site based on the determined positions, to generate the global map.

In some embodiments, the performing three-dimensional reconstruction on the monocular image is implemented by using an algorithm of a large scale structure from motion.

In some embodiments, the determining positions of the vehicle and a destination in the three-dimensional model of the driving site includes: identifying the monocular image using an image recognition technology, to determine positions of the vehicle and the destination in the monocular image; and converting the positions of the vehicle and the destination in the monocular image by projection transformation into the positions of the vehicle and the destination in the three-dimensional model of the driving site.

In some embodiments, the camera provided on the vehicle is a binocular camera, and the two-dimensional image of the site in front of the vehicle is a binocular image; and the generating a local map based on the two-dimensional image of the site in front of the vehicle includes: performing image matching on the binocular image, to obtain a parallax map of the binocular image; generating a depth map of the site in front of the vehicle based on the parallax map; and performing three-dimensional reconstruction on the depth map, to obtain the local map.

In some embodiments, the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

In some embodiments, the vehicle is an autonomous excavator.

In a second aspect, an embodiment of the present disclosure provides an apparatus for generating a driving path, including: an image acquiring unit configured to acquire a two-dimensional image of a driving site obtained by a camera provided on an unmanned aerial vehicle through aerial photography, and a two-dimensional image of a site in front of a vehicle photographed by a camera provided on the vehicle; a map generating unit configured to generate a global map based on the two-dimensional image of the driving site, and generate a local map based on the two-dimensional image of the site in front of the vehicle; and a path generating unit configured to perform path planning based on the global map and the local map, to generate a global path and a local path, the local path following a direction of the global path.

In some embodiments, the camera provided on the unmanned aerial vehicle is a monocular camera, and the two-dimensional image of the driving site is a monocular image; and the map generating unit includes: a driving site reconstructing subunit configured to perform three-dimensional reconstruction on the monocular image, to obtain a three-dimensional model of the driving site; a position determining subunit configured to determine positions of the vehicle and a destination in the three-dimensional model of the driving site; and a global map generating subunit configured to annotate the three-dimensional model of the driving site based on the determined positions, to generate the global map.

In some embodiments, the performing three-dimensional reconstruction on the monocular image is implemented by using an algorithm of a large scale structure from motion.

In some embodiments, the position determining subunit includes: an image identifying module configured to identify the monocular image using an image recognition technology, to determine positions of the vehicle and the destination in the monocular image; and a projection transformation module configured to convert the positions of the vehicle and the destination in the monocular image by projection transformation into the positions of the vehicle and the destination in the three-dimensional model of the driving site.

In some embodiments, the camera provided on the vehicle is a binocular camera, and the two-dimensional image of the site in front of the vehicle is a binocular image; and the map generating unit includes: an image matching subunit configured to perform image matching on the binocular image, to obtain a parallax map of the binocular image; a depth map generating subunit configured to generate a depth map of the site in front of the vehicle based on the parallax map; and a local map reconstructing subunit configured to perform three-dimensional reconstruction on the depth map, to obtain the local map.

In some embodiments, the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

In some embodiments, the vehicle is an autonomous excavator.

In a third aspect, an embodiment of the present disclosure provides an electronic device, including: one or more processors; and a storage apparatus, storing one or more programs thereon, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the computer program, when executed by a processor, implements the method according to any one implementation in the first aspect.

The method and apparatus for generating a driving path provided in embodiments of the present disclosure first acquire a two-dimensional image of a driving site obtained by a camera provided on an unmanned aerial vehicle through aerial photography, and a two-dimensional image of a site in front of a vehicle photographed by a camera provided on the vehicle; then generate a global map based on the two-dimensional image of the driving site, and generate a local map based on the two-dimensional image of the site in front of the vehicle; and finally perform path planning based on the global map and the local map, to generate a global path and a local path. Global coarse-grained sensing is achieved using the camera provided on the unmanned aerial vehicle, local fine-grained sensing is achieved using the camera provided on the vehicle, a sensing system of the vehicle is formed by combining the two, and expensive laser sensors are no longer depended on, thereby reducing the costs of generating a driving path. Moreover, the laser sensors sense merely depth and intensity information with sparse depth points and a limited amount of information. However, the camera provided on the unmanned aerial vehicle may be used to sense more abundant information, including not only depth information, but also other useful information, such as semantic information, thereby enhancing the sensing ability of the sensing system composed of the camera provided on the unmanned aerial vehicle and the camera provided on the vehicle.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
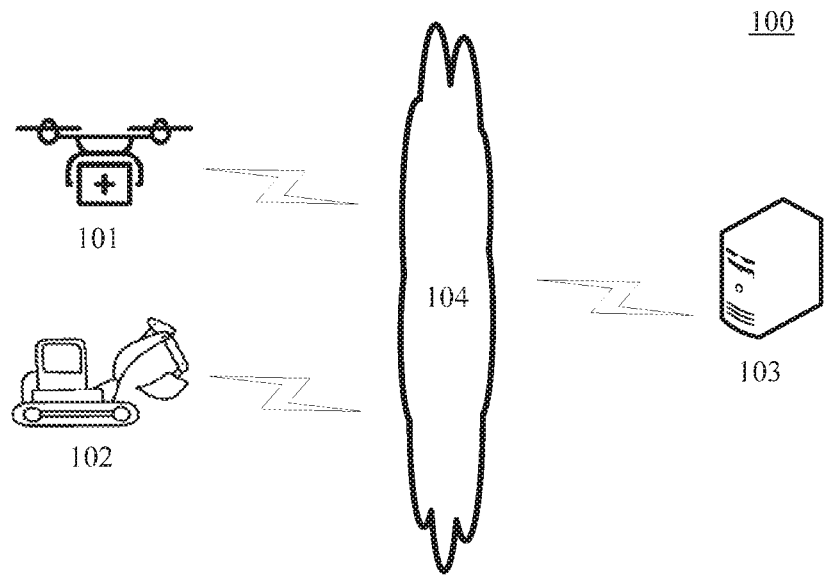
FIG. 1 is a diagram of an example system architecture in which embodiments of the present disclosure may be implemented.

FIG. 1 shows an example system architecture 100 in which a method for generating a driving path or an apparatus for generating a driving path of embodiments of present disclosure may be implemented.

As shown in FIG. 1, the system architecture 100 may include an unmanned aerial vehicle 101, a vehicle 102, a server 103, and a network 104. The network 104 serves as a medium providing a communication link between the unmanned aerial vehicle 101, the vehicle 102, and the server 103. The network 104 may include various types of connections, such as wired or wireless communication links, or optical cables.

The unmanned aerial vehicle 101 may be provided with a camera for aerial photography of a two-dimensional image of a driving site of the vehicle 102. In general, the camera provided on the unmanned aerial vehicle 101 may be a monocular camera for aerial photography of a monocular image of the driving site.

The vehicle 102 may be provided with a camera for photographing a two-dimensional image of a site in front of the vehicle 102. In general, the camera provided on the vehicle 102 may be a binocular camera provided in the front of the vehicle 102 for photographing a binocular image of the site in front of the vehicle.

The server 103 may provide various services, e.g., a back-end server of the vehicle 102. The back-end server of the vehicle 102 may first acquire the two-dimensional image of the driving site obtained by the camera provided on the unmanned aerial vehicle 101 through aerial photography from the camera provided on the unmanned aerial vehicle, and acquire the two-dimensional image of the site in front of the vehicle photographed by the camera provided on the vehicle 102 from the camera provided on the vehicle; and then process, e.g., analyze, the acquired two-dimensional image of the driving site and the acquired two-dimensional image of the site in front of the vehicle, and generate a processing result (e.g., a global path and a local path).

It should be noted that the server 103 may be hardware or software. When the server 103 is hardware, the server may be implemented as a distributed server cluster including a plurality of servers, or be implemented as a single server. When the server 103 is software, the server may be implemented as a plurality of software programs or software modules (e.g., software programs or software modules for providing distributed services), or be implemented as a single software program or software module. This is not specifically limited here.

It should be noted that the method for generating a driving path provided in some embodiments of the present disclosure is generally executed by the server 103. Accordingly, the apparatus for generating a driving path is generally provided in the server 103.

It should be understood that the numbers of unmanned aerial vehicles, vehicles, servers, and networks in FIG. 1 are merely illustrative. Any number of unmanned aerial vehicles, vehicles, servers, and networks may be provided based on practical requirements.

Figure 2:
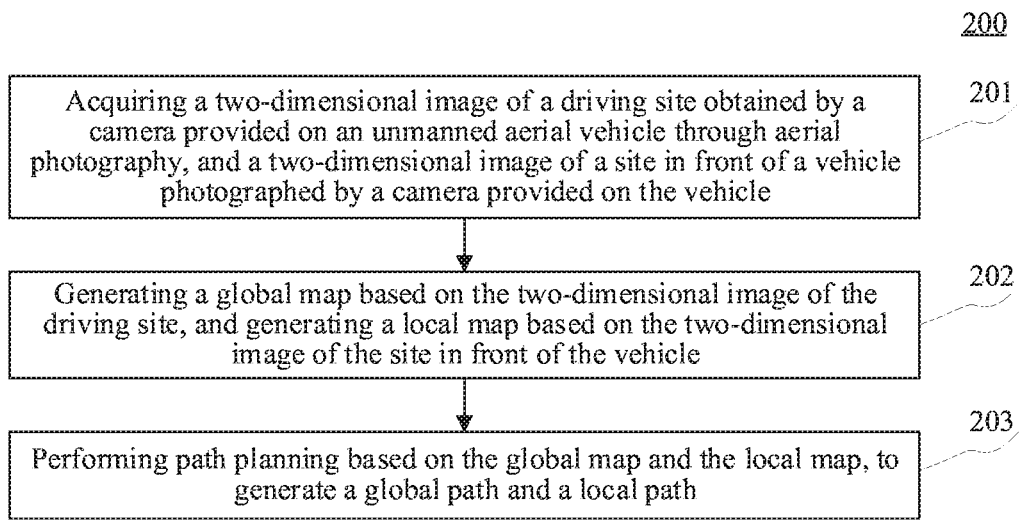
FIG. 2 is a flowchart of a method for generating a driving path according to an embodiment of the present disclosure.

Further referring to FIG. 2, a process 200 of a method for generating a driving path according to an embodiment of the present disclosure is shown. The method for generating a driving path includes the following steps.

Step 201: acquiring a two-dimensional image of a driving site obtained by a camera provided on an unmanned aerial vehicle through aerial photography, and a two-dimensional image of a site in front of a vehicle photographed by a camera provided on the vehicle.

In the present embodiment, an executing body (e.g., the server 103 shown in FIG. 1) of the method for generating a driving path may acquire the two-dimensional image obtained by the camera provided on the unmanned aerial vehicle (e.g., the unmanned aerial vehicle 101 shown in FIG. 1) through aerial photography of the driving site of the vehicle from the camera provided on the unmanned aerial vehicle. In addition, the executing body may acquire the two-dimensional image obtained by the camera provided on the vehicle (e.g., the vehicle 102 shown in FIG. 1) through photographing the site in front of the vehicle from the camera provided on the vehicle. The driving site may be a site in which the vehicle is driving, including an origin and a destination of the vehicle. The site in front of the vehicle may be a site of an area in front of the vehicle, and is a part of site belonging to the driving site. Generally, a current location of the vehicle is on the edge of the site in front of the vehicle.

In practice, the unmanned aerial vehicle may be provided with the camera, and when the unmanned aerial vehicle flies above the driving site, the camera provided thereon may be switched on for aerial photography of the driving site. Likewise, the vehicle may be provided with the camera. Generally, the camera may be provided in the front of the vehicle, such that the camera provided on the vehicle may photograph the site in front of the vehicle in real time or periodically.

Step 202: generating a global map based on the two-dimensional image of the driving site, and generating a local map based on the two-dimensional image of the site in front of the vehicle.

In the present embodiment, the executing body may analyze the two-dimensional image of the driving site, and generate a map of the driving site based on the analysis result of the two-dimensional image of the driving site, for use as the global map. In addition, the executing body may analyze the two-dimensional image of the site in front of the vehicle, and generate a map of the site in front of the vehicle based on the analysis result of the two-dimensional image of the site in front of the vehicle, for use as the local map of the driving site. The global map may be a three-dimensional model of the driving site, and may include the origin and the destination of the vehicle. The local map may be a three-dimensional model of the site in front of the vehicle. For example, the camera provided on the unmanned aerial vehicle may photograph two-dimensional images of the driving site in a plurality of angles. Thus, the executing body may perform three-dimensional reconstruction using the two-dimensional images of the driving site in the plurality of angles, to obtain the global map. In addition, the camera provided on the vehicle may photograph two-dimensional images of the site in front of the vehicle in a plurality of angles. Thus, the executing body may perform three-dimensional reconstruction using the two-dimensional images of the site in front of the vehicle in the plurality of angles, to obtain the local map.

Step 203: performing path planning based on the global map and the local map, to generate a global path and a local path.

In the present embodiment, the executing body may perform global path planning based on the global map, to generate the global path. Then, the executing body may further perform local path planning based on the local map and the global path, to generate the local path. The global path may be a collision-free path with the origin of the vehicle as a starting point, and the destination of the vehicle as an end point. The local path may be a collision-free path with a current position of the vehicle as a starting point, and the local path follows a direction of the global path.

In practice, since the global path is generated based on coarse-grained information obtained by the camera provided on the unmanned aerial vehicle through aerial photography, and belongs to a coarse-grained path, the global path is less accurate. Further, the global map may include not only static objects (e.g., a tree, and a material pile), but also dynamic objects (e.g., other vehicles, and people). Positions of the dynamic objects on the global map are positions at a moment when the unmanned aerial vehicle performs aerial photography of the driving site. The positions of the dynamic objects may continuously change as time goes on. Based on the above two characteristics of the global path, if the vehicle autonomously drives along the global path, it is impossible to completely guarantee that the vehicle does not collide with an obstacle. Thus, the executing body further needs to generate the local path following the direction of the global path based on the local map and the global path. Since the local path is generated based on fine-grained information photographed by the camera provided on the vehicle, and belongs to a fine-grained path, the local path is relatively accurate. At the same time, since the site in front of the vehicle is an area of a small scope in the driving site, it only takes very short time from the camera provided on the vehicle photographing the two-dimensional image of the site in front of the vehicle to the vehicle driving to an endpoint of the local path along the local path. In the meanwhile, the positions of the dynamic objects change a little. Based on the above two characteristics of the local path, if the vehicle autonomously drives along the local path, the vehicle generally may not collide with the obstacle.

In some alternative implementations of the present embodiment, the local path generally may meet at least one of the following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path, or the like.

In some alternative implementations of the present embodiment, the vehicle may be an autonomous excavator. In this case, the driving site may be a work site of the autonomous excavator. An origin of the autonomous excavator maybe a current location of the autonomous excavator. A destination of the autonomous excavator may be a location of a material pile to be excavated by the autonomous excavator. The material pile may be formed by stacking materials. The materials mainly include soil, coal, silt, pre-loosened soil and rock, or the like.

It should be noted that the executing body may generate the global path and the local path using various path planning algorithms (e.g., SLAM (simultaneous localization and mapping), and VSLAM (visual simultaneous localization and mapping)), or generate the global path and the local path using various pre-trained deep neural networks (e.g., a multilayer convolutional neural network) for generating a driving path. The above various path planning algorithms and various deep neural networks for generating a driving path are well-known technologies that are widely researched and applied at present. The description will not be repeated here.

The method for generating a driving path provided in some embodiments of the present disclosure first acquires a two-dimensional image of a driving site obtained by a camera provided on an unmanned aerial vehicle through aerial photography, and a two-dimensional image of a site in front of a vehicle photographed by a camera provided on the vehicle; then generates a global map based on the two-dimensional image of the driving site, and generates a local map based on the two-dimensional image of the site in front of the vehicle; and finally performs path planning based on the global map and the local map, to generate a global path and a local path. Global coarse-grained sensing is achieved using the camera provided on the unmanned aerial vehicle, local fine-grained sensing is achieved using the camera provided on the vehicle, a sensing system of the vehicle is formed by combining the two, and expensive laser sensors are no longer depended on, thereby reducing the costs of generating a driving path. Moreover, the laser sensors sense merely depth and intensity information with sparse depth points and a limited amount of information. However, the camera provided on the unmanned aerial vehicle may be used to sense more abundant information, including not only depth information, but also other useful information, such as semantic information, thereby enhancing the sensing ability of the system composed of the camera provided on the unmanned aerial vehicle and the camera provided on the vehicle.

Figure 3:
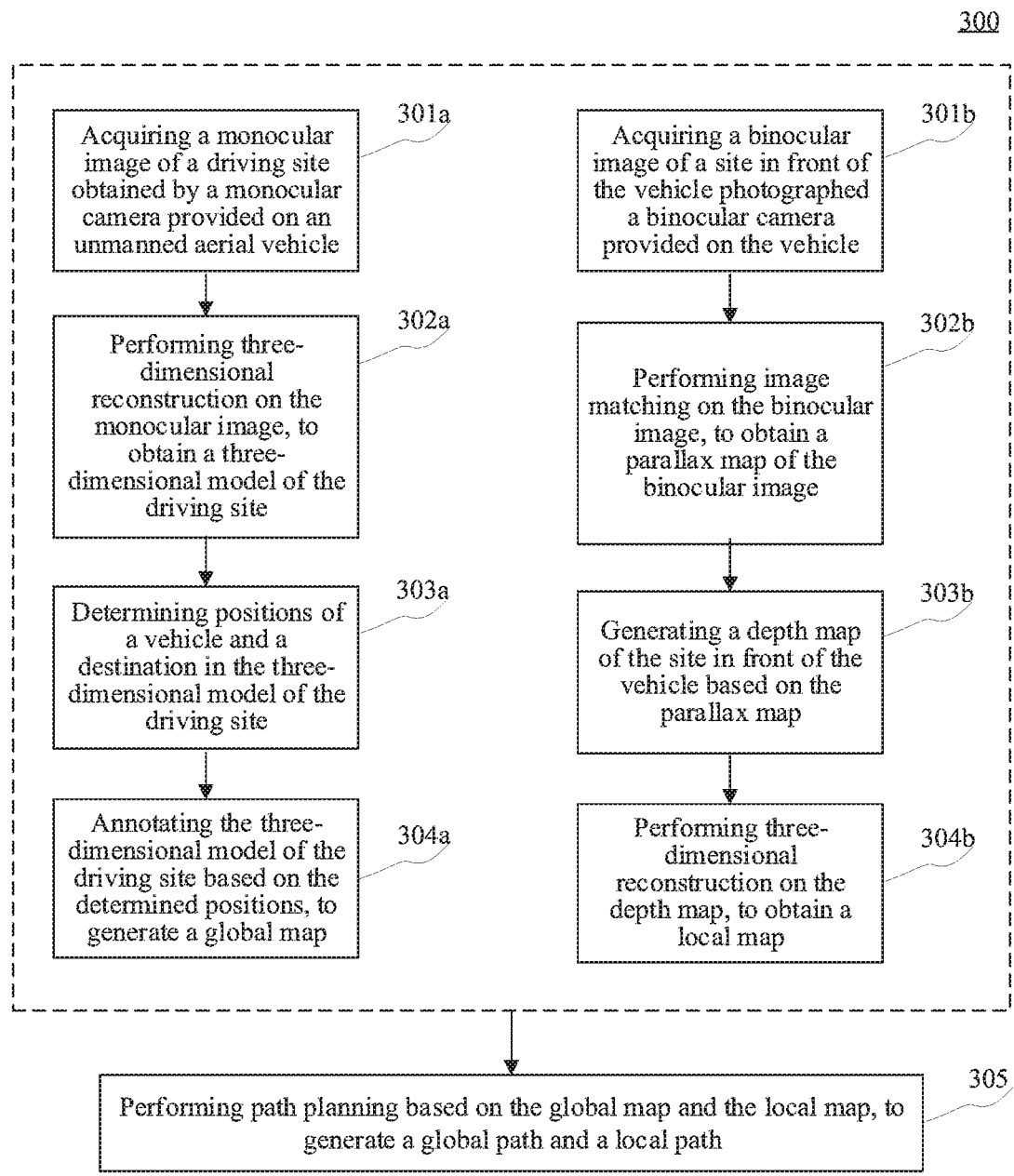
FIG. 3 is a flowchart of the method for generating a driving path according to another embodiment of the present disclosure.

Further referring to FIG. 3, a process 300 of the method for generating a driving path according to another embodiment of the present disclosure is shown. The method for generating a driving path includes the following steps.

Step 301a: acquiring a monocular image of a driving site obtained by a monocular camera provided on an unmanned aerial vehicle.

In the present embodiment, an executing body (e.g., the server 103 shown in FIG. 1) of the method for generating a driving path may acquire the monocular image obtained by the monocular camera provided on the unmanned aerial vehicle (e.g., the unmanned aerial vehicle 101 shown in FIG. 1) through aerial photography of the driving site of a vehicle from the monocular camera provided on the unmanned aerial vehicle. The camera provided on the unmanned aerial vehicle may be the monocular camera, and the two-dimensional image of the driving site may be the monocular image.

Step 302a: performing three-dimensional reconstruction on the monocular image, to obtain a three-dimensional model of the driving site.

In the present embodiment, the executing body may analyze the monocular image of the driving site of the vehicle acquired by the monocular camera provided on the unmanned aerial vehicle from the monocular camera provided on the unmanned aerial vehicle, and generate the three-dimensional model of the driving site based on the analysis result.

In some alternative implementations of the present embodiment, an approach of the performing three-dimensional reconstruction on the monocular image may be an algorithm of a large scale structure from motion. A structure from motion (SFM) is a technology capable of automatically recovering camera parameters and a three-dimensional structure of a scenario from a plurality of images or a video sequence, and has wide applications, for example, may be applied to the fields, such as augmented reality, robots, and autonomous driving. The large scale structure from motion is the structure from motion for a large scale scenario.

Step 303a: determining positions of a vehicle and a destination in the three-dimensional model of the driving site.

In the present embodiment, the executing body may identify the vehicle and the destination in the three-dimensional model of the driving site, and determine the positions of the vehicle and the destination in the three-dimensional model of the driving site.

In some alternative implementations of the present embodiment, the executing body may identify the three-dimensional model of the driving site using an 0, to determine the positions of the vehicle and the destination in the three-dimensional model of the driving site.

In some alternative implementations of the present embodiment, the executing body may first identify the monocular image using the image recognition technology, to determine positions of the vehicle and the destination in the monocular image; and then convert the positions of the vehicle and the destination in the monocular image by projection transformation into the positions of the vehicle and the destination in the three-dimensional model of the driving site.

Step 304a: annotating the three-dimensional model of the driving site based on the determined positions, to generate a global map.

In the present embodiment, the executing body may find the vehicle and the destination in the three-dimensional model of the driving site based on the positions of the vehicle and the destination in the three-dimensional model of the driving site, and annotate the found vehicle and destination, to generate the global map.

Step 301b: acquiring a binocular image of a site in front of the vehicle photographed a binocular camera provided on the vehicle.

In the present embodiment, the executing body may acquire the binocular image obtained by the binocular camera provided on the vehicle (e.g., the vehicle 102 shown in FIG. 1) through photographing the site in front of the vehicle from the binocular camera provided on the vehicle. The camera provided on the vehicle maybe the binocular camera, and the two-dimensional image of the site in front of the vehicle may be the binocular image.

Step 302b: performing image matching on the binocular image, to obtain a parallax map of the binocular image.

In the present embodiment, the executing body may perform matching on the acquired binocular image of the site in front of the vehicle obtained by the binocular camera provided on the vehicle from the binocular camera provided on the vehicle, thus obtaining the parallax map of the binocular image. Generally, since the binocular image is photographed by the binocular camera through imitating a working mechanism of the eyes of an animal, there is a certain degree of horizontal parallax between each group of binocular images.

Step 303b: generating a depth map of the site in front of the vehicle based on the parallax map.

In the present embodiment, the executing body may analyze the parallax map, to generate the depth map of the site in front of the vehicle. Specifically, the executing body may determine a distance from the site in front of the vehicle to the binocular camera based on the horizontal parallax, to obtain the depth map of the site in front of the vehicle.

Step 304b: performing three-dimensional reconstruction on the depth map, to obtain a local map.

In the present embodiment, the executing body may perform three-dimensional reconstruction on the depth map of the site in front of the vehicle using a three-dimensional reconstruction algorithm, thus obtaining the local map. For example, the executing body may perform three-dimensional reconstruction on the depth map using Kinect Fusion algorithm, to obtain the local map.

Step 305: performing path planning based on the global map and the local map, to generate a global path and a local path.

In the present embodiment, specific operations in step 305 have been introduced in detail in step 203 in the embodiment shown in FIG. 2. The description will not be repeated here.

Figure 4:
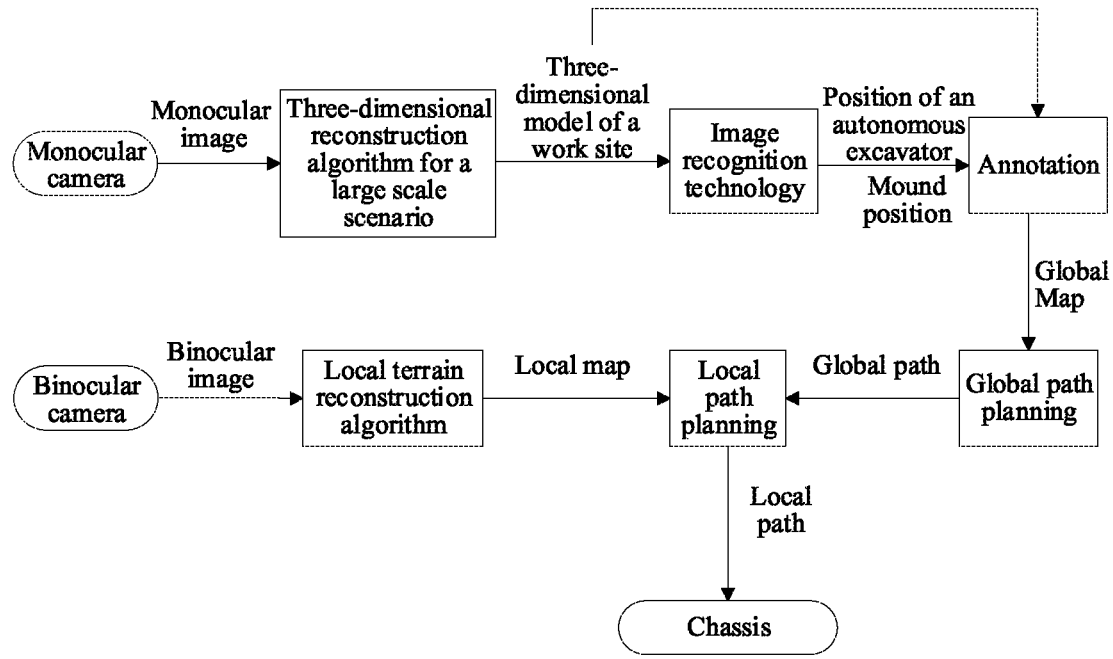
FIG. 4 is a schematic diagram of an application scenario of the method for generating a driving path provided in FIG. 3.

Further referring to FIG. 4, FIG. 4 is a schematic diagram of an application scenario of the method for generating a driving path provided in FIG. 3. In the application scenario shown in FIG. 4, an autonomous excavator needs to excavate a mound on a work site. First, an unmanned aerial vehicle is controlled to fly above the work site, switch on a monocular camera provided thereon for aerial photography of a monocular image of the work site, and transmit the monocular image to a back-end server of the autonomous excavator. Thus, the back-end server may perform three-dimensional reconstruction on the monocular image using a three-dimensional reconstruction algorithm for a large scale scenario, to obtain a three-dimensional model of the work site. A position of the autonomous excavator and a position of the mound in the three-dimensional model of the work site are identified using an image recognition technology, and the autonomous excavator and the mound in the three-dimensional model of the work site are annotated based on the identified positions, to generate a global map. Global path planning is performed based on the global map, to generate a global path. Then, a binocular camera provided in the front of the body of the autonomous excavator is switched on to photograph a binocular image of a site in front of the autonomous excavator, and transmit the binocular image to the back-end server of the autonomous excavator. Thus, the back-end server may perform three-dimensional reconstruction on the binocular image using a local terrain reconstruction algorithm, to obtain a local map. Local path planning is performed based on the local map and the global path, to generate a local path following a direction of the global path. In this case, the back-end server may control a speed of a chassis of the autonomous excavator based on the local path, such that the autonomous excavator autonomously drives along the local path. When driving to an end point of the local path, the binocular camera is switched on again to photograph a site in front of the autonomous excavator, and the generating a local path is continued to be executed to generate a new local path. The speed of the chassis of the autonomous excavator is controlled based on the new local path, such that the autonomous excavator autonomously drives along the new local path. The processes are iterated, until the autonomous excavator drives to a position close to the mound.

As can be seen from FIG. 3, compared with the corresponding embodiment of FIG. 2, the process 300 of the method for generating a driving path in the present embodiment highlights generating a global map and a local map. Thus, a monocular image of a driving site is photographed by a monocular camera provided on an unmanned aerial vehicle, and three-dimensional reconstruction is performed on the monocular image to generate the global map. Moreover, a binocular image of a site in front of a vehicle is photographed by a binocular camera provided on the vehicle, and three-dimensional reconstruction is performed on the binocular image of the site in front of the vehicle to generate the local map, thereby improving the efficiency and accuracy of generating the global map and the local map.

Figure 5:
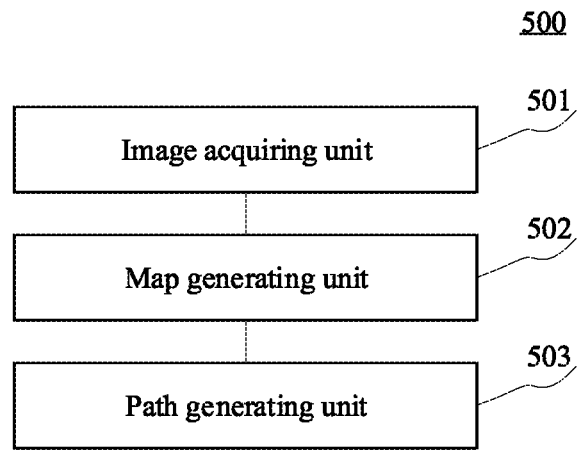
FIG. 5 is a schematic structural diagram of an apparatus for generating a driving path according to an embodiment of the present disclosure.

Further referring to FIG. 5, as an implementation of the method shown in the above figures, an embodiment of the present disclosure provides an apparatus for generating a driving path. An embodiment of the apparatus may correspond to the embodiment of the method shown in FIG. 2. The apparatus may be specifically applied to various electronic devices.

As shown in FIG. 5, the apparatus 500 for generating a driving path of the present embodiment may include: an image acquiring unit 501, a map generating unit 502, and a path generating unit 503. The image acquiring unit 501 is configured to acquire a two-dimensional image of a driving site obtained by a camera provided on an unmanned aerial vehicle through aerial photography, and a two-dimensional image of a site in front of a vehicle photographed by a camera provided on the vehicle; the map generating unit 502 is configured to generate a global map based on the two-dimensional image of the driving site, and generate a local map based on the two-dimensional image of the site in front of the vehicle; and the path generating unit 503 is configured to perform path planning based on the global map and the local map, to generate a global path and a local path, the local path following a direction of the global path.

The related description of step 201, step 202, and step 203 in the corresponding embodiment of FIG. 2 may be referred to for specific processing of the image acquiring unit 501, the map generating unit 502, and the path generating unit 503 of the apparatus 500 for generating a driving path in the present embodiment and the technical effects thereof, respectively. The description will not be repeated here.

In some alternative implementations of the present embodiment, the camera provided on the unmanned aerial vehicle is a monocular camera, and the two-dimensional image of the driving site is a monocular image; and the map generating unit 502 includes: a driving site reconstructing subunit (not shown in the figure) configured to perform three-dimensional reconstruction on the monocular image, to obtain a three-dimensional model of the driving site; a position determining subunit (not shown in the figure) configured to determine positions of the vehicle and a destination in the three-dimensional model of the driving site; and a global map generating subunit (not shown in the figure) configured to annotate the three-dimensional model of the driving site based on the determined positions, to generate the global map.

In some alternative implementations of the present embodiment, the performing three-dimensional reconstruction on the monocular image is implemented by using an algorithm of a large scale structure from motion.

In some alternative implementations of the present embodiment, the position determining subunit includes: an image identifying module (not shown in the figure) configured to identify the monocular image using an image recognition technology, to determine positions of the vehicle and the destination in the monocular image; and a projection transformation module (not shown in the figure) configured to convert the positions of the vehicle and the destination in the monocular image by projection transformation into the positions of the vehicle and the destination in the three-dimensional model of the driving site.

In some alternative implementations of the present embodiment, the camera provided on the vehicle is a binocular camera, and the two-dimensional image of the site in front of the vehicle is a binocular image; and the map generating unit 502 includes: an image matching subunit (not shown in the figure) configured to perform image matching on the binocular image, to obtain a parallax map of the binocular image; a depth map generating subunit (not shown in the figure) configured to generate a depth map of the site in front of the vehicle based on the parallax map; and a local map reconstructing subunit (not shown in the figure) configured to perform three-dimensional reconstruction on the depth map, to obtain the local map.

In some alternative implementations of the present embodiment, the local path meets at least one of the following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

In some alternative implementations of the present embodiment, the vehicle is an autonomous excavator.

Figure 6:
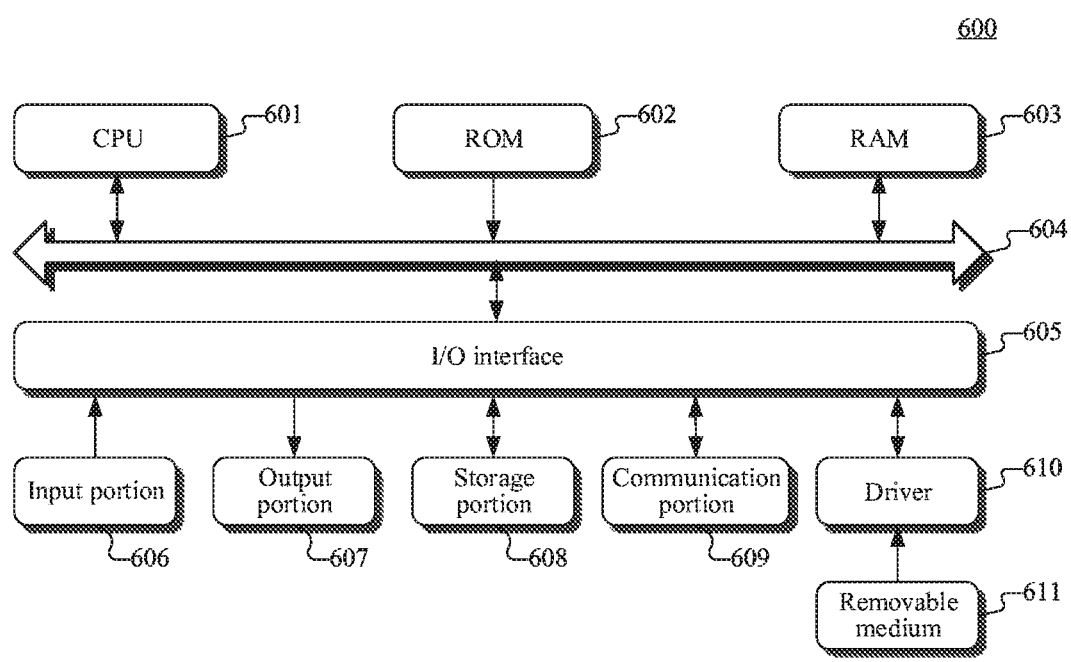
FIG. 6 is a schematic structural diagram of a computer system adapted to implement an electronic device of some embodiments of the present disclosure.

Referring to FIG. 6 below, a schematic structural diagram of a computer system 600 adapted to implement an electronic device (e.g., the server 103 in FIG. 1) of some embodiments of the present disclosure is shown. The electronic device shown in FIG. 6 is merely an example, and should not limit the functions and scope of use of some embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 further stores various programs and data required by operations of the system 600. The CPU 601, the ROM 602, and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, such that a computer program read therefrom is installed in the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication portion 609, and/or may be installed from the removable medium 611. The computer program, when executed by the central processing unit (CPU) 601, implements the above functions defined by the methods of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer maybe connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that maybe implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including an image acquiring unit, a map generating unit, and a path generating unit. The names of the units do not constitute a limitation to such units themselves in some cases. For example, the image acquiring unit may be further described as "a unit configured to acquire a two-dimensional image of a driving site obtained by a camera provided on an unmanned aerial vehicle through aerial photography, and a two-dimensional image of a site in front of a vehicle photographed by a camera provided on the vehicle."

In another aspect, an embodiment of the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire a two-dimensional image of a driving site obtained by a camera provided on an unmanned aerial vehicle through aerial photography, and a two-dimensional image of a site in front of a vehicle photographed by a camera provided on the vehicle; generate a global map based on the two-dimensional image of the driving site, and generate a local map based on the two-dimensional image of the site in front of the vehicle; and perform path planning based on the global map and the local map, to generate a global path and a local path, the local path following a direction of the global path.

The above description only provides explanation of embodiments and the employed technical principles of some embodiments of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:

1. A method for generating a driving path, comprising:
acquiring a first two-dimensional image of a driving site obtained by a first camera arranged on an unmanned aerial vehicle through aerial photography, and a second two-dimensional image of a site in front of a vehicle photographed by a second camera arranged on the vehicle;
generating a global map based on the first two-dimensional image of the driving site,
generating a local map based on the second two-dimensional image of the site in front of the vehicle, wherein the second camera is a binocular camera, and the second two-dimensional image of the site in front of the vehicle is a binocular image, and the generating the local map based on the second two-dimensional image of the site in front of the vehicle comprises: performing image matching on the binocular image, to obtain a parallax map of the binocular image; generating a depth map of the site in front of the vehicle based on the parallax map, the depth map of the site in front of the vehicle indicating a distance from the site in front of the vehicle to the binocular camera; and performing three-dimensional reconstruction on the depth map, to obtain the local map; and
performing global path planning based on the global map to generate a global path, and performing local path planning based on the local map and the global path to generate a local path, the local path following a direction of the global path,
wherein the first two-dimensional image obtained by the first camera arranged on the unmanned aerial vehicle comprises an image of the vehicle provided with the second camera photographing the second two-dimensional image of the site in front of the vehicle, and generating a global map based on the first two-dimensional image of the driving site comprises:
performing three-dimensional reconstruction on the first two-dimensional image, to obtain a three-dimensional model of the driving site;

determining a position of the vehicle and a destination in the three-dimensional model of the driving site by performing an image recognition on the first two-dimensional image; and annotating the three-dimensional model of the driving site based on the determined position, to generate the global map.

2. The method according to claim 1, wherein the first camera arranged on the unmanned aerial vehicle is a monocular camera, and the first two-dimensional image of the driving site is a monocular image.

3. The method according to claim 2, wherein the performing three-dimensional reconstruction on the monocular image is implemented by using an algorithm of a large scale structure from motion.

4. The method according to claim 2, wherein the determining a position of the vehicle and a destination in the three-dimensional model of the driving site by performing an image recognition on the first two-dimensional image comprises:

identifying the monocular image using the image recognition, to determine a position of the vehicle and a destination in the monocular image; and converting the position of the vehicle and the destination in the monocular image by projection transformation into the position of the vehicle and the destination in the three-dimensional model of the driving site.

5. The method according to claim 1, wherein the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

6. The method according to claim 1, wherein the vehicle is an autonomous excavator.

7. An apparatus for generating a driving path, comprising:
at least one processor; and
a memory storing instructions, the instructions when executed by the at least one processor, cause the at least one processor to perform operations, the operations comprising:
acquiring a first two-dimensional image of a driving site obtained by a first camera arranged on an unmanned aerial vehicle through aerial photography, and a second two-dimensional image of a site in front of a vehicle photographed by a second camera arranged on the vehicle;
generating a global map based on the first two-dimensional image of the driving site,
generating a local map based on the second two-dimensional image of the site in front of the vehicle, wherein the second camera is a binocular camera, and the second two-dimensional image of the site in front of the vehicle is a binocular image, and the generating the local map based on the second two-dimensional image of the site in front of the vehicle comprises: performing image matching on the binocular image, to obtain a parallax map of the binocular image; generating a depth map of the site in front of the vehicle based on the parallax map, the depth map of the site in front of the vehicle indicating a distance from the site in front of the vehicle to the binocular camera; and performing three-dimensional reconstruction on the depth map, to obtain the local map; and performing global path planning based on the global map to generate a global path, and performing local path planning based on the local map and the global path to generate a local path, the local path following a direction of the global path, wherein the first two-dimensional image obtained by the first camera arranged on the unmanned aerial vehicle comprises an image of the vehicle provided with the second camera photographing the second two-dimensional image of the site in front of the vehicle, and generating a global map based on the first two-dimensional image of the driving site comprises:

performing three-dimensional reconstruction on the first two-dimensional image, to obtain a three-dimensional model of the driving site;

determining a position of the vehicle and a destination in the three-dimensional model of the driving site by performing an image recognition on the first two-dimensional image; and annotating the three-dimensional model of the driving site based on the determined position, to generate the global map.

8. The apparatus according to claim 7, wherein the first camera arranged on the unmanned aerial vehicle is a monocular camera, and the first two-dimensional image of the driving site is a monocular image.

9. The apparatus according to claim 8, wherein the performing three-dimensional reconstruction on the monocular image is implemented by using an algorithm of a large scale structure from motion.

10. The apparatus according to claim 8, wherein the determining a position of the vehicle and a destination in the three-dimensional model of the driving site by performing an image recognition on the first two-dimensional image comprises:

identifying the monocular image using the image recognition, to determine a position of the vehicle and a destination in the monocular image; and converting the position of the vehicle and the destination in the monocular image by projection transformation into the position of the vehicle and the destination in the three-dimensional model of the driving site.

11. The apparatus according to claim 7, wherein the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

12. The apparatus according to claim 7, wherein the vehicle is an autonomous excavator.

13. A non-transitory computer readable medium, storing a computer program thereon, wherein the computer program, when executed by a processor, causes the processor to perform operations, the operations comprising:

acquiring a first two-dimensional image of a driving site obtained by a first camera arranged on an unmanned aerial vehicle through aerial photography, and a second two-dimensional image of a site in front of a vehicle photographed by a second camera arranged on the vehicle;

generating a global map based on the first two-dimensional image of the driving site, generating a local map based on the second two-dimensional image of the site in front of the vehicle, wherein the second camera is a binocular camera, and the second two-dimensional image of the site in front of the vehicle is a binocular image, and the generating the local map based on the second two-dimensional image of the site in front of the vehicle comprises: performing image matching on the binocular image, to obtain a parallax map of the binocular image; generating a depth map of the site in front of the vehicle based on the parallax map, the depth map of the site in front of the vehicle indicating a distance from the site in front of the vehicle to the binocular camera; and performing three-dimensional reconstruction on the depth map, to obtain the local map; and performing global path planning based on the global map to generate a global path, and performing local path planning based on the local map and the global path to generate a local path, the local path following a direction of the global path, wherein the first two-dimensional image obtained by the first camera arranged on the unmanned aerial vehicle comprises an image of the vehicle provided with the second camera photographing the second two-dimensional image of a site in front of the vehicle, and generating a global map based on the first two-dimensional image of the driving site comprises:

performing three-dimensional reconstruction on the first two-dimensional image, to obtain a three-dimensional model of the driving site;

determining a position of the vehicle and a destination in the three-dimensional model of the driving site by performing an image recognition on the first two-dimensional image; and annotating the three-dimensional model of the driving site based on the determined position, to generate the global map.

* * * * *